United States Patent [19]
Nahumi

[11] Patent Number: 5,898,675
[45] Date of Patent: Apr. 27, 1999

[54] VOLUME CONTROL ARRANGEMENT FOR COMPRESSED INFORMATION SIGNALS

[76] Inventor: Dror Nahumi, 49 Stonehenge Dr., Ocean, N.J. 07712

[21] Appl. No.: 08/639,405

[22] Filed: Apr. 29, 1996

[51] Int. Cl.$^6$ .............................. H04L 12/16; H04Q 11/00
[52] U.S. Cl. ............................................ 370/260; 379/202
[58] Field of Search .................................... 370/259, 260, 370/262, 265, 266, 267, 477; 379/202, 203, 204, 206, 205; 348/14, 15, 16, 578; 415/5.1

[56] References Cited

U.S. PATENT DOCUMENTS

| | | | |
|---|---|---|---|
| 5,127,001 | 6/1992 | Steagall et al. | 379/202 |
| 5,260,938 | 11/1993 | Hofmann | 379/202 |
| 5,383,184 | 1/1995 | Champion | 379/202 |
| 5,491,743 | 2/1996 | Shiio et al. | 379/202 |
| 5,559,875 | 9/1996 | Bieselin et al. | 379/202 |
| 5,570,363 | 10/1996 | Holm | 379/202 |

*Primary Examiner*—Ajit Patel
*Attorney, Agent, or Firm*—Charles I. Brodsky

[57] ABSTRACT

The arrangement of the invention allows for modifying amplitude, frequency or phase characteristics, for example, of an audio or video signal in a compressed signal system without altering the encoder or decoder employed by each conferee in communications information conferencing. A control network inserted between the encoder and decoder permits demultiplexing the compressed bitstream signal into sensitive parameters of the signal to be controlled, as well as into those parameters whose characteristics are not of concern. The control is then effected on the parameters of concern, in a way so as to eliminate the signal degradation associated with general tandeming signal decoding and coding operations of all characteristics in establishing the scaling control desired.

10 Claims, 2 Drawing Sheets

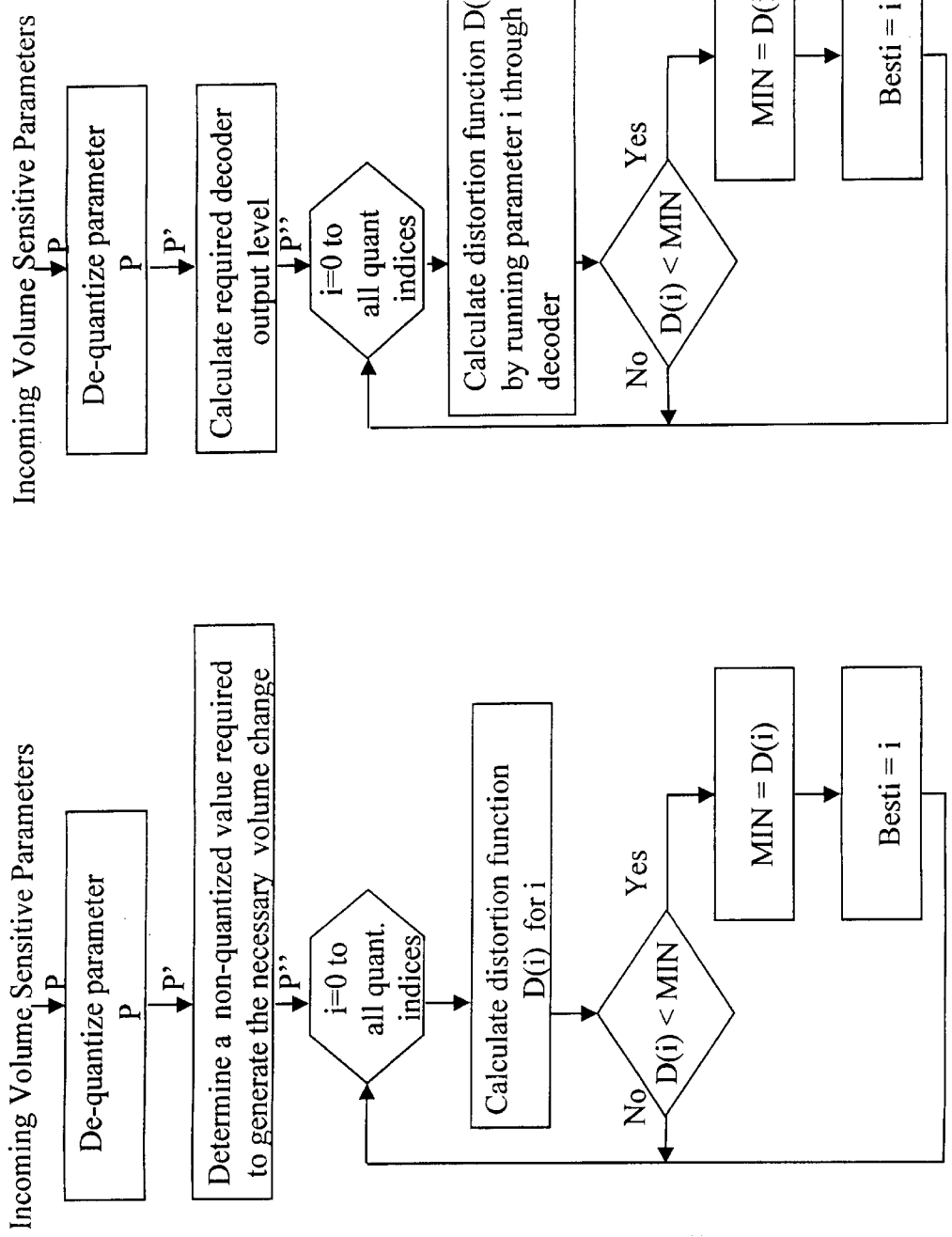

VOLUME CONTROL ARRANGEMENT FOR COMPRESSED INFORMATION SIGNALS

FIELD OF THE INVENTION

This invention relates to conferencing capabilities for compressed signals—and, more particularly, to an improvement of the conferencing arrangement described in my U.S. Pat. No. 5,390,177, which issued on Feb. 14, 1995.

BACKGROUND OF THE INVENTION

As my previous patent describes, conferencing is the capability of coupling information signals among three or more users in a communications system—typically in voice format, but also for data, video, facsimile and like nonvoice signals. As is there set forth, problems existed with prior arrangements dealing with compressed information signals in that degradation resulted in signal quality due to the tandem serial connection of coders and decoders to respectively compress and decompress the various information signals. In accordance with that invention, a conferencing arrangement was described which detected whether there were one or more conferees speaking, for example, on a line at any one time; when there was only one conferee speaking, a summer in the conference bridge unit was bypassed, and that conferee's signal was then broadcast directly to all other conferees; when there were more than one conferee speaking, the signals of those that were speaking were first routed to an associated speech decoder, decompressed, summed, and then recompressed again before being broadcast. As set forth in my issued patent, a conferencing arrangement operating in that manner reduced signal degradation associated with the tandeming of the signal coders and decoders, and permitted the sharing of a smaller number of signal decoders amongst a larger number of conferees.

Even with this, however, it has been determined that improved conferencing could be had if the arrangement employed allowed a degree of volume control for individual conferees, and/or for automatic gain control for all conferees speaking—whether or not at one time. However, the techniques employed in the prior art for volume control in systems utilizing compression algorithms to minimize signal bandwidth operate to degrade the quality of the signal due to the signal loss in each single encoder and decoder in the serial connection as well.

OBJECTS OF THE INVENTION

It would, therefore, be desirable if a conferencing arrangement could be devised for compressed speech signals which overcomes the limitations of the prior art.

It would also be desirable if a conferencing arrangement could be devised for other types of compressed signals, beyond voice, to allow a selected or automatic gain control, in the conferencing arrangement without degrading the quality of the signal rebroadcast to all conferees.

SUMMARY OF THE INVENTION

As will become clear from the following description, these objects of the invention, simply speaking, are satisfied by a technique of modifying only that specific parameter in the compressed domain, without the need to fully decode and encode the entire voice or nonvoice signal. As will be understood, this follows from the realization that not all the parameters of the compressed signal are gain or level related, for example, and the conference bridge incorporating logic circuit can be readily designed to decode only those parameters of a compressed bitstream to then be worked upon and scaled. In the context of volume control as an illustration, then, the parameters in the compressed bitstream can be demultiplexed into non-volume sensitive parameters and into volume sensitive parameters, and where only the volume sensitive parameters are then requantized.

BRIEF DESCRIPTION OF THE DRAWINGS

These and other features of the present invention will be more clearly understood from a consideration of the following description, taken in connection with the accompanying drawings, in which:

FIG. 3 is a flow chart illustrating a typical search procedure for a linear decoding system helpful in an understanding of the invention; and FIG. 4 is a flow chart illustrating a typical search procedure where the decoding system is nonlinear.

DETAILED DESCRIPTION OF THE DRAWINGS

Figure 1:
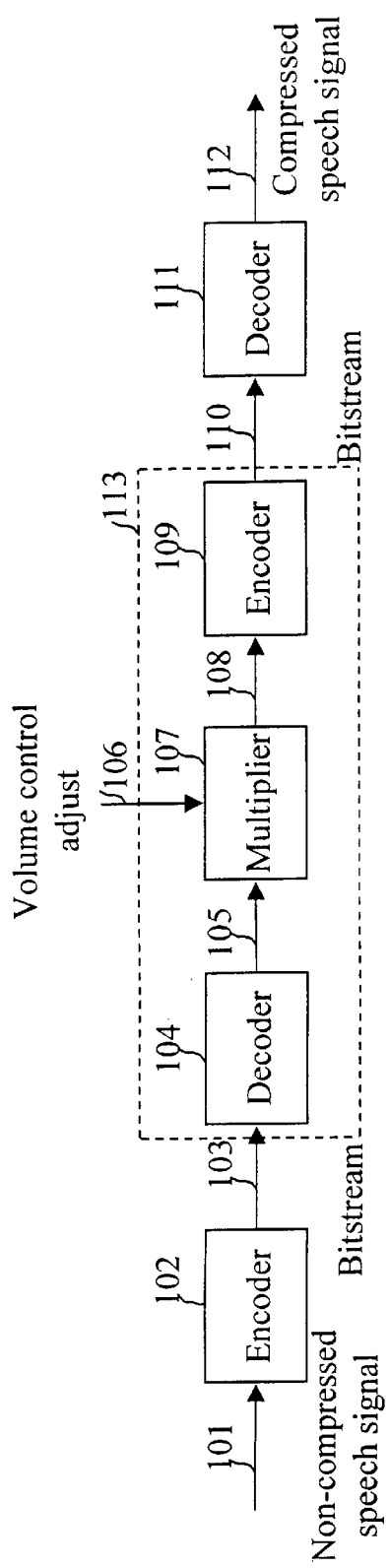
FIG. 1 is a block-schematic diagram of a prior art arrangement to modify the volume of decoded speech of a single bitstream.

In FIG. 1, a non-compressed speech signal 101 for illustrative voice conferencing communication is converted into a compressed bitstream by an encoder 102 to a set of compressed parameters such as quantization table indices at 103. A compression decoder 111, on the other hand, converts the bitstream back to the speech domain, as at 112, after it has been acted upon in a compressed signal control system 113, as in volume adjustment. As will be understood, for volume control in 113, the compressed bitstream at 103 is converted back to speech with a decoder 104 (as at 105), then multiplied at 107 by a volume control adjust at 106 in obtaining the scaled speech signal at 108. An encoder 109 then converts the signal at 108 back to the compressed domain 110, to be decoded by the decoder 111 prior to being rebroadcast at a then levelled volume control speech signal at 112.. Whether there be one conferee talking on the line, or more than one, the serial connection of the decoder 104 and the encoder 109 respectively decompress and compress the speech signal and degrades the resulting signal quality to a level that has been found to be objectionable to many conferees, in trial studies.

Figure 2:
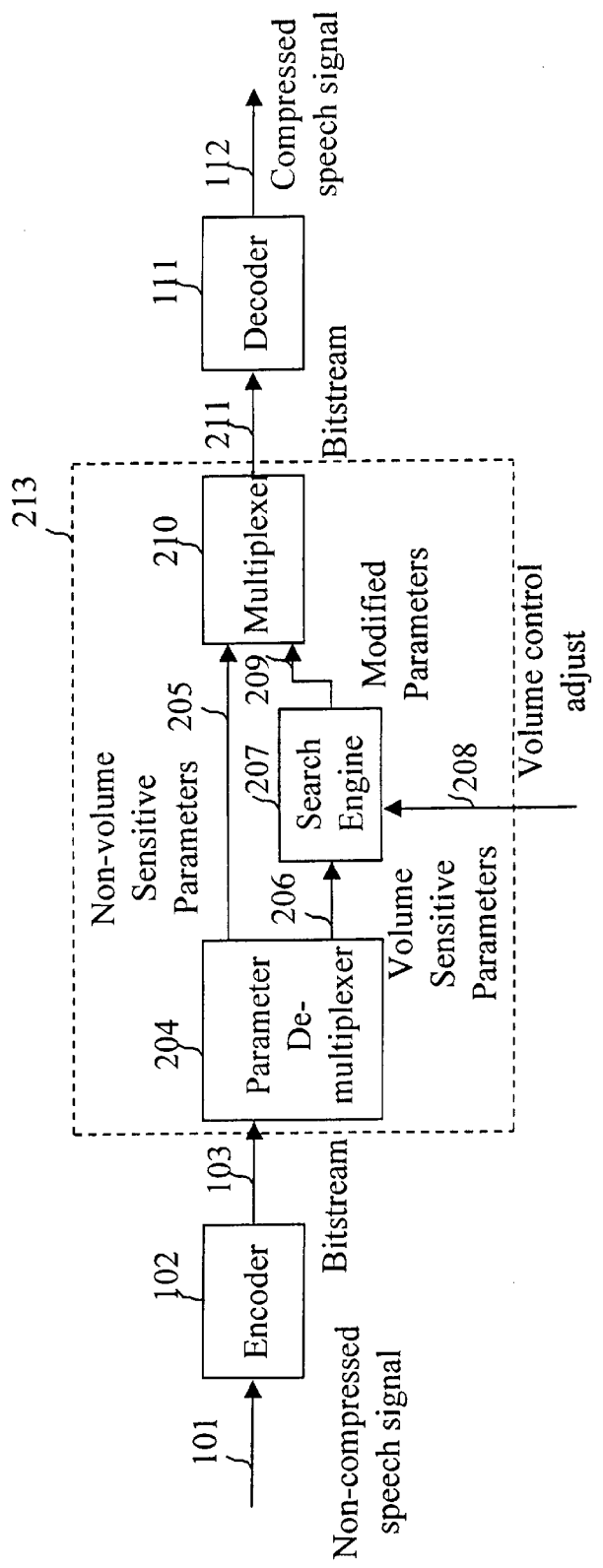
FIG. 2 is a block-schematic diagram of a system for volume control of such a compressed signal according to the invention.

In the illustrative embodiment of the present invention shown in FIG. 2, this signal degradation associated with the tandeming of the coding change is reduced by modifying only the volume sensitive parameters of the compressed bitstream, without the need to fully decode and then encode the entire bitstream signal. Thus, the compressed bitstream 103 is first de-multiplexed in a de-multiplexer 204 of a compressed signal control system 213 into volume sensitive parameters 206 (such as gain indices or frequency quantization) and into non-volume sensitive parameters 205 (such as phase quantization, uniform pulse location, etc.). One or more of the volume sensitive parameters at 206 is then coupled to a search engine 207 for requantization in accordance with the control being exerted at 208—in this case a volume control to increase or decrease the level of the speech signal. As is known, the search engine 207 searches for the best quantization index to give the volume increase in this illustrative example at the end, i.e., such that the ultimately decoded speech signal at 214 would be of as high a quality as possible, as close to the quality at 214 that would be available if the compressed signal control system 213 were bypassed, and with as close a scaling as to the requested, in this case volume, scaling. In other words, the search engine 207 searches through all the quantization values in seeking to find the volume increase desired with as minimum quality degradation as possible.

The volume-sensitive parameters modified in this matter at 209 is then multiplexed with the non-volume sensitive parameters at 205 in a multiplexer 210 to yield the compressed bitstream 211 for application to the decoder 111. The end result, it will be appreciated, is that the speech signal output at 214 is varied in volume according to the requirements imposed at 208, yet without having to change either the encoder 102 or the decoder 111 which are standard implementations in modems or personal computers, and which are fixed, already part of the conferencing arrangement. The result will be seen to permit modification of the volume, in this instance, of an audio or video signal in a compressed system, where no control is possible for the encoder or decoders employed, simply by modifying the compressed parameters, through demultiplexing the bitstream to volume related and non-volume related parameters. With a search optimized for searching through a set of quantization indices, a minimal distortion to the decoded signal can be produced, in a manner that changes the volume, for example, at the decoded end by the required factor.

FIGS. 3 and 4 describe a typical procedure in the search engine 207 and in the logic circuitry that is there included. With the flow chart of FIG. 3, for use when the decoder 111 is of a linear function, the volume control can be changed substantially without calculating exactly what the decoder 111 will produce every time. Because the decoder 111 is typically a linear function, any change in the energy of one function will produce a comparable change at the end, without having to recalculate the decoder function every time a new index is found. In the implementation of the search engine 207 for the flow chart of FIG. 3, a volume sensitive parameter P is obtained as an index, converted from the compressed bitstream domain to an unquantized meaningful number P' and then scaled to a new, unquantized number P'' depending upon the volume level desired. That unquantized value P'' is then quantized using a typical search function for each level, to calculate the distortion function in determining how near that new quantization level is to what it is desired to be, in attempting to produce it as close to that desired level as possible. Each distortion function $D_i$ is calculated for each investigation, and when determined to be lower than the minimum acceptable, recalculations are continued until all tables have been searched. Once the calculation is above the minimum, then the best level is the one previously investigated. In some systems, this quantization of P'' may be done using vector quantization techniques when more than one parameter is quantized as a vector of parameters. In such systems, as is known, a weighting function may be used to search for the closest quantization value of P'', while making as small changes as possible to the other parameters.

FIG. 4, on the other hand, represents the flow chart where the decoder 111 operates nonlinearly, where it is not known beforehand what the change of control at 208 would produce on the decoder 111 itself. In such situation, for each index i, the decoder function would normally have to be recalculated again to determine what effect would be produced on the speech signal to be rebroadcast. Alternatively stated, in this situation, the gain cannot be simply calculated and quantized orthogonally with respect to the decoding function, so that the decoder function has to be recalculated in accordance to what the level increase produces. Thus, the search function operates to find the best quantization value P''', while taking the nonlinearity in the decoder 111 into account.

It should, of course, be noted that while the present invention has been described in terms of an illustrative embodiment, other arrangements will be apparent to those of ordinary skill in the art. For example, while the present invention has been described relative to the conferencing of compressed digital signals representative of speech, the present invention is applicable to the processing of compressed digital signals regardless of the information represented by such signals. Thus, while the invention has been couched in terms of modifying volume control parameters and then multiplexing them with nonmodified, non-volume control parameters back to a standard bitstream, the teachings here are equally available to those in an adaptive volume control environment, where the levels are to be changing continuously. Similarly, where it is desired to change other speech effects of a decoded signal—such as pitch deviation, echoes, amplitude, frequency or phase modulations, given time delays so that a conferee can obtain the sense of where different speakers may be standing in a room utilizing a speakerphone set-up—the control arrangement of the invention would continue to operate as described, by merely breaking the parameters into those of interest to be controlled, and those whose importance is not that relevant. As with frequency shaping, as well, once the sensitive parameters are demultiplexed from the non-sensitive parameters, means of modification can be effected without the degradation inherent in the decoding-encoding chain of the control network, where no control is possible on the compressed bitstream encoder or decoder. Similarly, while the disclosed embodiment of the invention has been described utilizing discreet devices, it will be readily understood that such devices can be implemented using one or more appropriately programmed general purpose processors, or special-purpose integrated circuits, or digital processors, or an analog or hybrid counterpart of any of these devices. Thus, and as will be appreciated, implementation can be had in such software on state of the art VLSI chips, such as DSP chips known in the art.

As will also be appreciated by those skilled in the art, where one has the gains separated, and one can be set to zero while others not so similarly set, a whole conferencing system can be implemented just be applying gains of zero and non-zero—i.e. that if one were to look at the whole conference as a large matrix of inputs and outputs, individual lines can be connected by setting individual gain levels to "1" for connection or to "0" where an absence of connection is desired—and in the compressed bitstream domain. In like manner, having the gain controls available, one can implement nested conferences between participants in an overall larger conferencing environment, by setting gains from nested conferees to non-nested conferees to "0". All that is required in this arrangement is to have sufficient system resource hardware available, which acts as the sole limitation in implementing the system. As likewise will be appreciated, having gain control levels in this manner, permits modification by allowing for "weighting function" to be established amongst different participants in the virtual reality environment—for example, as between different "virtual" participants in any given room environment.

For at least the foregoing reasons, therefore, resort should be had to the claims appended hereto for a true understanding of the scope of the invention.

I claim:

1. Control apparatus for a communications conferencing system operating on a sequence of received compressed digital signal samples comprising:

means for receiving said compressed digital signal samples;

means for demultiplexing said compressed digital signal samples into first and second digital signals of differing compressed parameter characteristics;

means for modifying said compressed parameter characteristics of said first digital signal in a predetermined manner;

means for combining said first digital signal as modified with said second digital signal; and means for decompressing said combined signals onto an output communications path.

2. The control apparatus of claim 1 wherein said combining means combines said first digital signal as modified with said second digital signal as a digital bitstream.

3. The control apparatus of claim 2 wherein said decompressing means provides a decoded signal of a modified first compressed parameter characteristic and of an unmodified second compressed parameter characteristic.

4. The control apparatus of claim 3 wherein said demultiplexing means demultiplexes said compressed digital signal samples to signals of volume rated parameter characteristics and to signals of non-related parameter characteristics, respectively.

5. The control apparatus of claim 4 wherein said decompressing means provides a decoded signal of modified volume characteristic.

6. The control apparatus of claim 4 wherein said decompressing means provides a decoded signal of automatic gain control characteristic.

7. The control apparatus of claim 3 wherein said demultiplexing means demultiplexes said compressed digital signal samples to signals of amplitude modulation parameter characteristics and to signals of non-amplitude modulation parameter characteristics respectively.

8. The control apparatus of claim 3 wherein said demultiplexing means demultiplexes said compressed digital signal samples to signals of frequency modulation parameter characteristics and to signals of non-frequency modulation parameter characteristics respectively.

9. The control apparatus of claim 3 wherein said demultiplexing means demultiplexes said compressed digital signal samples to signals of phase modulation parameter characteristics and to signals of non-phase modulation parameter characteristics respectively.

10. A method for modifying predetermined amplitude, frequency or phase modulation compressed parameter characteristics of a communications conferencing system having a fixed encoder and decoder comprising:

demultiplexing compressed digital signal samples to a first signal of said compressed parameter characteristic of concern, and to a second signal of a differing compressed parameter characteristic of no concern, respectively;

modifying only said compressed parameter characteristic of concern of said first signal; and combining said modified first signal with said second signal.

* * * * *